United States Patent
Masberg et al.

[11] Patent Number: 6,138,629
[45] Date of Patent: *Oct. 31, 2000

[54] SYSTEM FOR ACTIVELY REDUCING RADIAL VIBRATIONS IN A ROTATING SHAFT, AND METHOD OF OPERATING THE SYSTEM TO ACHIEVE THIS

[75] Inventors: Ullrich Masberg, Rösrath/Kleineichen; Thomas Pels, Overath; Klaus-Peter Zeyen, Köln; Andreas Gründl, München; Bernhard Hoffmann, Starnberg, all of Germany

[73] Assignees: ISAD Electronic Systems GmbH & Co. KG, Cologne; Grundl und Hoffman GmbH, Starnberg, both of Germany

[*] Notice: This patent issued on a continued prosecution application filed under 37 CFR 1.53(d), and is subject to the twenty year patent term provisions of 35 U.S.C. 154(a)(2).

[21] Appl. No.: 09/043,567

[22] PCT Filed: Aug. 31, 1996

[86] PCT No.: PCT/DE96/01665

§ 371 Date: Jul. 23, 1998

§ 102(e) Date: Jul. 23, 1998

[87] PCT Pub. No.: WO97/08477

PCT Pub. Date: Mar. 6, 1997

[30] Foreign Application Priority Data

Aug. 31, 1995 [DE] Germany .............. 195 32 135
Aug. 31, 1995 [DE] Germany .............. 195 32 163

[51] Int. Cl.[7] .............. F02B 75/06; H02K 33/00
[52] U.S. Cl. .............. 123/192.1; 310/51; 318/114
[58] Field of Search .............. 123/192.1; 310/51; 318/114, 126, 127, 128; 335/266; 60/698, 713, 716, 718, 719; 180/65.2, 65.4

[56] References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,774,303 | 11/1973 | Burkett et al. | 30/382 |
| 3,870,116 | 3/1975 | Seliber | 180/54 R |

(List continued on next page.)

FOREIGN PATENT DOCUMENTS

| | | |
|---|---|---|
| 58401-73 | 1/1975 | Australia . |
| 0 151 935 A1 | 8/1985 | European Pat. Off. . |
| 0 175 952 A2 | 4/1986 | European Pat. Off. . |
| 0 233 738 A1 | 4/1986 | European Pat. Off. . |
| 0 338 485 A2 | 10/1989 | European Pat. Off. . |
| 0 354 790 A2 | 2/1990 | European Pat. Off. . |

(List continued on next page.)

OTHER PUBLICATIONS

N. Saridakis, "Golf mit Otto–Elektro–Hybridantrieb", ATZ, Atutomobiltechnische Zeitschrift 87 (1985) 11, pp. 581–584.

H. Baumann, Siedekühlgefäβ mit Luftrühlung für Traktionsstromrichter hoher Leistun:, etzArchiv, vol. 11. 1989, No. 7, pp. 213–220.

E. Blessmann, "Magnetic Couplings", Machine Design, Feb. 9, 1989, pp. 105–108.

(List continued on next page.)

*Primary Examiner*—Tony M. Argenbright
*Assistant Examiner*—Brian J Hairston
*Attorney, Agent, or Firm*—Blakely, Sokoloff, Taylor & Zafman LLP

[57] ABSTRACT

The invention concerns a system for active reduction of radial vibrations of a rotating shaft (4), especially the drive shaft of an internal combustion engine (1), with at least one active electromagnetic device (7; 10; 15, 16), which is configured and controlled such that it applies radial forces to the shaft (4), which counteract the radial vibrations of the shaft (4).

8 Claims, 5 Drawing Sheets

U.S. PATENT DOCUMENTS

| | | | |
|---|---|---|---|
| 3,902,073 | 8/1975 | Lafuze | 290/46 |
| 3,974,396 | 8/1976 | Schönball | 290/54 |
| 4,025,860 | 5/1977 | Shibata et al. | 320/3 |
| 4,066,936 | 1/1978 | Hirota | 318/139 |
| 4,346,773 | 8/1982 | Hofbauer et al. | 180/165 |
| 4,699,097 | 10/1987 | Tanaka et al. | 123/192 |
| 4,797,602 | 1/1989 | West | 322/10 |
| 4,803,376 | 2/1989 | N'Guyen | 290/22 |
| 4,883,973 | 11/1989 | Lakey et al. | 290/31 |
| 4,942,950 | 7/1990 | Watanabe et al. | 192/0.096 |
| 4,958,095 | 9/1990 | Uchida et al. | 310/59 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,949,162 | 9/1999 | Mishkevich et al. | 310/51 |

FOREIGN PATENT DOCUMENTS

| | | |
|---|---|---|
| 0 385 311 A2 | 9/1990 | European Pat. Off. . |
| 0 427 568 A1 | 5/1991 | European Pat. Off. . |
| 0 437 266 A2 | 7/1991 | European Pat. Off. . |
| 0 440 088 A1 | 8/1991 | European Pat. Off. . |
| 0 530 659 A1 | 3/1993 | European Pat. Off. . |
| 0 557 522 A1 | 9/1993 | European Pat. Off. . |
| 0 569 347 A2 | 11/1993 | European Pat. Off. . |
| 0 604 979 A2 | 7/1994 | European Pat. Off. . |
| 0 612 928 A1 | 8/1994 | European Pat. Off. . |
| 2481656 | 11/1981 | France . |
| 2563280 | 10/1985 | France . |
| 282 671 | 8/1912 | Germany . |
| 874 713 | 6/1952 | Germany . |
| 893 299 | 1/1953 | Germany . |
| 904 737 | 6/1953 | Germany . |
| 938 680 | 6/1954 | Germany . |
| 1 077 072 | 3/1960 | Germany . |
| 1 156 319 | 10/1963 | Germany . |
| 1 165 422 | 3/1964 | Germany . |
| 1 284 853 | 12/1968 | Germany . |
| 23 45 018 A1 | 4/1974 | Germany . |
| 23 53 724 B2 | 5/1974 | Germany . |
| 27 04 533 A1 | 8/1978 | Germany . |
| 28 55 886 A1 | 6/1979 | Germany . |
| 29 02 376 C2 | 7/1979 | Germany . |
| 28 23 255 A1 | 11/1979 | Germany . |
| 29 17 139 A1 | 11/1980 | Germany . |
| 29 43 563 A1 | 5/1981 | Germany . |
| 30 09 503 A1 | 9/1981 | Germany . |
| 30 13 424 A1 | 10/1981 | Germany . |
| 30 48 972 C2 | 7/1982 | Germany . |
| 30 50 269 A1 | 10/1982 | Germany . |
| 32 30 121 A1 | 2/1984 | Germany . |
| 32 30 607 A1 | 2/1984 | Germany . |
| 32 43 513 A1 | 5/1984 | Germany . |
| 33 43 018 C2 | 6/1984 | Germany . |
| 32 43 514 C2 | 9/1984 | Germany . |
| 33 35 923 A1 | 9/1984 | Germany . |
| 33 38 548 A1 | 5/1985 | Germany . |
| 35 37 994 A1 | 5/1986 | Germany . |
| 37 37 192 A1 | 7/1988 | Germany . |
| 38 14 484 A1 | 11/1988 | Germany . |
| 37 43 289 A1 | 6/1989 | Germany . |
| 38 12 296 A1 | 11/1989 | Germany . |
| 39 37 082 A1 | 5/1990 | Germany . |
| 39 26 054 A1 | 2/1991 | Germany . |
| 40 27 664 A1 | 3/1991 | Germany . |
| 39 39 695 C1 | 5/1991 | Germany . |
| 40 38 301 A1 | 6/1991 | Germany . |
| 40 00 678 A1 | 7/1991 | Germany . |
| 41 00 937 A1 | 8/1991 | Germany . |
| 40 11 291 A1 | 10/1991 | Germany . |
| 41 34 268 A1 | 4/1992 | Germany . |
| 42 13 132 A1 | 11/1992 | Germany . |
| 41 24 496 A1 | 1/1993 | Germany . |
| 42 02 083 A1 | 7/1993 | Germany . |
| 42 02 737 A1 | 8/1993 | Germany . |
| 42 30 510 C1 | 9/1993 | Germany . |
| 42 25 683 A1 | 2/1994 | Germany . |
| 43 30 193 A1 | 3/1994 | Germany . |
| 43 18 949 C1 | 6/1994 | Germany . |
| 43 39 252 A1 | 6/1994 | Germany . |
| 43 91 898 C2 | 6/1994 | Germany . |
| 43 44 053 A1 | 7/1994 | Germany . |
| 43 11 697 A1 | 10/1994 | Germany . |
| 43 14 290 A1 | 11/1994 | Germany . |
| 43 23 601 A1 | 1/1995 | Germany . |
| 43 23 602 A1 | 1/1995 | Germany . |
| 44 04 791 C1 | 3/1995 | Germany . |
| 295 02 906 U1 | 4/1995 | Germany . |
| 44 02 152 C1 | 4/1995 | Germany . |
| 44 37 322 A1 | 5/1995 | Germany . |
| 44 21 512 C1 | 6/1995 | Germany . |
| 44 08 719 C1 | 7/1995 | Germany . |
| 44 23 577 A1 | 8/1995 | Germany . |
| 44 12 945 A1 | 10/1995 | Germany . |
| 44 12 438 C1 | 11/1995 | Germany . |
| 55005454 | 1/1980 | Japan . |
| 58126434 | 7/1983 | Japan . |
| 59184020 | 10/1984 | Japan . |
| 61066820 | 8/1986 | Japan . |
| 61200333 | 9/1986 | Japan . |
| 62166749 | 7/1987 | Japan . |
| 1113571 | 5/1989 | Japan . |
| 1190922 | 8/1989 | Japan . |
| 4024156 | 1/1992 | Japan . |
| 05211258 | 8/1993 | Japan . |
| 07105943 | 4/1995 | Japan . |
| 20 42 772 | 9/1980 | United Kingdom . |
| WO 88/08636 | 11/1988 | WIPO . |
| WO 91/16538 | 10/1991 | WIPO . |
| WO 94/19856 | 9/1994 | WIPO . |
| WO 95/02758 | 1/1995 | WIPO . |
| WO 95/24072 | 9/1995 | WIPO . |

OTHER PUBLICATIONS

Robert bosch GmbH, "Kraftfahrtechnisches Tashenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumrichterantrieben" etz, vol. 114, 1993, No. 17, pp. 1060–1067.

W. Geißler, F. Unger–Weber: "Modelling the Three–Phase Propulsion System of a Modern Multisystem–Locamotive", EPE Firenze, (1991), pp. 4–632–4 637.

G. und H. Häberle, "Elektrische Maschinen in Anlagen der Energietechnik", Verlag Europa–Lehrmittel, Haan–Gruiten, 3. Auflage, 1994, Seiten 169–172.

G. Henneberger, "Elektrische Motoraustrüstung", Braunschweig, 1990, pp. 98–103.

J. Langheim, J. Fetz: "Electric Citybus with two Induction Motors–Power Electronics and Motor Control", ETEP, vol. 2, No. 6, Nov./Dec. 1992, pp. 359–365.

"Kraftfahrzeugtechnik"11/82, pp. 346–347.

Litton prospect "Bürstenloser Hohwellen–Resolver SSBH–15", Unterföhring.

J. Reinert et al., "Digital Control and Optimization of a Rolling Rotor Switched Reluctance Maching", IEEE Transactions on Industry Applications, vo. 31, No. 2, Mar. Apr. 1995, pp. 338–344.

F. Simovert, "Spannungszwischenkreis–Umrichter Baureihe 6SC44. . der Fa. Siemens AG", 1985, No. A 19100–E319–A262.

D. Teodorescu, "Kleinantriebe mit Vollpolläufer–Synchronmotoren", ema, May 1993, pp. 39–43.

SYSTEM FOR ACTIVELY REDUCING RADIAL VIBRATIONS IN A ROTATING SHAFT, AND METHOD OF OPERATING THE SYSTEM TO ACHIEVE THIS

BACKGROUND OF THE INVENTION

1. Field of the Invention

The present invention relates to systems for reducion of radial vibrations of a rotating shaft.

2. Description of the Related Art

The invention concerns a system for active reduction of radial vibrations of a rotating shaft.

In piston engines, a multitude of various vibrations occurs as a result of the masses moving back and forth, as well as of the discontinuous combustion in the chamber. Besides vibrations of the overall engine, the drive shaft (i.e., the crankshaft) is excited in radial vibrations relative to the engine housing containing it. Because of the practically no-play mounting of the crankshaft in the radial direction, these vibrations are bending vibrations. Excitation of the vibrations occurs primarily through the radial components of the mass forces on the crank pins.

The bending vibrations represent a high stress on the crankshaft. Therefore, the crankshaft must be correspondingly heavily dimensioned in terms of strength. This requires, in particular, high-quality material and a costly production process (e.g., die forging). Furthermore, heavily loaded engines (such as diesel motors) must generally have a bearing after each crank throw. This produces great static overdetermination.

Resonance rises can occur in engines, especially those with a low number of cylinders, since the crankshaft along with the generally required flywheel forms an oscillatory system of low eigenfrequency, lying in the operating range of the internal combustion engine. This may produce resonance rises which can lead to fracture of the crankshaft.

To avoid resonance rises, vibration absorbers and dampeners are traditionally employed. A vibration absorber is an extra passive mass elastically coupled to the vibration system. The elastic coupling of the additional mass results in shifting of the original resonance frequency of the vibration system (more accurately, the original resonance frequency splits up into two different resonance frequencies). Through appropriate design of the extra mass and the stiffness of the elastic coupling, in many cases it is possible to make the new resonance frequencies no longer lie in the operating range, or at least no longer lie in an especially critical part of the operating range. Furthermore, by choosing a strongly dampening elastic coupling one can remove vibratory energy from the vibration system (by dissipation into heat) and reduce the size of any residual resonance rise (vibration dampener). In general, with the help of vibration absorbers/dampeners, one can master the problem of radial vibration in crankshafts.

SUMMARY OF THE INVENTION

A system for active reduction of radial vibrations of a rotating shaft (4), especially the drive shaft of an internal combustion engine (1), with at least one active electromagnetic device (7; 10; 15, 16), which is configured and controlled such that it applies radial forces to the shaft which counteract the radial vibrations of the shaft (4).

DETAILED DESCRIPTION OF THE EMBODIMENTS

The purpose of the invention is to provide a different solution for the radial vibration problem of a shaft, especially the drive shaft of an internal combustion engine.

It accomplishes this purpose through a system for active reduction of radial vibrations of a shaft, especially the drive shaft of an internal combustion engine with at least one active electromagnetic device, which is designed and controlled such that it applies radial forces to the shaft, which counteract the radial vibrations of the shaft.

Radial vibrations are excited by virtue of the periodically occurring gas and mass forces with a frequency corresponding to the rotary speed of the motor or a multiple thereof. In addition, there are irregular (sometimes stochastic) excitations of radial vibrations which may result, for example, from backfiring.

The active reduction of radial vibrations occurs, in particular, such that the force applied by the active electromagnetic device is each time directed opposite the instantaneous direction of the bending vibration motion (or at least a component thereof). In other words, the force is applied to the shaft in opposite phase to its radial velocity, i.e., with 180° phase displacement.

Yet different phase relationships are also possible (e.g., 190° instead of 180°), in order to diminish vibrations in other parts of the vehicle, which generally occur with a phase displacement.

If the shaft is exposed to forces which are directed opposite its radial velocity, energy will be withdrawn from its undesirable radial vibration - namely, the shaft performs work under the braking force of the active electromagnetic device. Consequently, the amplitude of the vibration decreases—the radial vibration is dampened.

The size and nature of the dampening are freely adjustable by means of the active electrical device according to the invention. Therefore, the system can be operated to have a more elastic or a more dampening characteristic. The characteristic can be changed during operation.

Basically, the active electromagnetic device can intrude into the region of a vibration antinode between two neighboring crankshaft bearings, i.e., inside the internal combustion engine. In general, however, an arrangement outside the engine is chosen. The active device then works, for example, outside the last crankshaft bearing, on an outwardly protruding stump of the crankshaft. When a radial vibration of the shaft occurs inside the engine, the shaft stump will also be caused to perform a radial vibration, due to the stiffness of the shaft. A dampening or suppression of this stump vibration has, due to the stiffness of the shaft, a corresponding effect on the bending vibration inside the engine.

The system according to the invention has the following benefits:

- it allows a very effective suppression or dampening of radial vibrations, especially of crankshafts;
- the suppression/dampening can occur over a broad frequency band;
- the degree of dampening and the dampening characteristics are freely adjustable in broad limits;
- because of the very effective vibration suppression/dampening, heavily loaded crankshafts can be created with lower expenditure/lower costs (namely, from less high-quality material and with less fabrication expense);

The system for active reduction of radial vibrations of a shaft can have at least one actuator as the active electromagnetic device. The actuator is a linear positioner which can exert forces on the shaft in the radial direction, for example, via a movable shaft bearing secured to its positioning element. Advantageously, this is a linear positioner which directly transforms an electrical control signal into a mechanical linear positioning under application of force, without a transformation of motion (say, through a gearing). The actuator can be designed, e.g., as an electromagnetic or electrodynamic actuator.

Especially preferable, however, the active electromagnetic device is an electric machine. By this is meant a rotational machine (motor/generator), i.e., a machine whose relatively movable active elements (e.g., rotor and stator) perform a relative rotational movement. Especially advantageous, one of the active elements (e.g., the rotor) sits directly on the rotating shaft and is preferably firmly connected to it. The other active element (or in the case of several: the active elements) is generally not able to turn, e.g., it is fastened to the crank housing (and is therefore termed the stator). Between these active elements is the air gap of the electric machine. Thus, force is applied to the shaft which is rotating and oscillating in radial direction via the air gap (dimensioned sufficiently broad).

In customary electric machines, such an action of force in the radial direction is undesirable; instead, only tangential forces (i.e., torques) are supposed to be generated: this is usually achieved by an axial-symmetrical field distribution, in which each radial force is compensated by an oppositely-directed force of equal magnitude, generated by an opposite point. This especially preferred configuration of the invention, however, has a non-axial symmetrical field distribution, so that (uncompensated) radial forces remain for active dampening of radial vibration.

The electric machine resembles a rotary-field machine, in which a rotary magnetic field generated by the stator drives the rotor. In such machines, the magnetic field sweeps through a full 360° circuit and is generally configured to compensate for radial force.

To avoid the radial force compensation, the generation of the field is limited to a circular sector (i.e., less than 360°, e.g., 90°, 120° or 180°). Several such field sectors are possible, and they can also be independently controllable of each other. Since the fields here do not perform complete revolutions, they are termed "traveling fields [waves]" (instead of "rotary fields").

The rotor can be, for example, a squirrel-cage rotor or a rotor with fixed magnetic poles; accordingly, the machine will resemble an induction or a synchronous machine, respectively. Especially advantageous are synchronous machines or reluctance machines (which are induction machines synchronized, e.g., by slots in the rotor), for they enable the sectoral configuration of the stator with practically no magnetic stray fields at the end surfaces of the sector or sectors.

If the electric machine comprises at least two functionally independent active sectors (which are not axially symmetrical opposite), radial forces in various (not parallel) directions can be applied to the shaft and, thus, especially radial vibrations of different directions can be counteracted.

The following cases can be distinguished for the dampening of radial vibration:

i) With only one active sector, a radial force of largely stationary direction and variable magnitude is applied to the shaft; this allows the dampening of one vibration direction, and in general a torque is also applied in this way.

ii) With two or more active sectors, the additional degree of freedom allows free choice in the direction and magnitude of the radial force. Here, again, a torque is generally applied to the shaft.

There are various ways of implementing the functionally independent active sectors. One advantageous possibility consists in that the sectors are sectors separated from each other (in particular, magnetically separated). The machine then corresponds to two or more sector machines, which work on a common rotor. In another preferred possibility, the functionally independent active sectors are formed by independent winding segments, which are arranged jointly on a magnetically conducting stator body. In this configuration, the electric machine—apart from the stator winding—corresponds to a conventional induction or synchronous machine in 360° geometry. The advantage of this configuration is the lesser extent of stray fields, due to the common stator.

Especially advantageous configurations shall be discussed hereafter, in which the electric machine takes on one or more additional functions. As explained above, the electric machine can preferably also apply a torque to the shaft.

Especially advantageous, the electric machine further serves to actively reduce rotational nonuniformities of the shaft by applying a rapidly varying torque to the shaft, for example, in opposite phase to the rotational nonuniformities. The rotational nonuniformities as well result chiefly from the gas and mass forces in an internal combustion engine.

By a "rapid variation" of the countertorque applied is meant a variation in the frequency range of the rotational nonuniformities being reduced. For example, the applied torque for rotational nonuniformity of second order and with a rotary speed of 3000 rpm varies at a frequency of 100 Hz.

The active reduction of rotational nonuniformities by means of an electric machine or an eddy current brake is known in the state of the art (see, for example, Patent Abstracts of Japan, Vol. 11, No. 28 (M-557), Jan. 27, 1987 and JP-A-61 200 333; Patent Abstracts of Japan, Vol. 4, No. 29 (M-002), Mar. 14, 1980; JP-A-55 005 454; EP-A-0 427 568; DE-A-32 30 607; EP-A-0 175 952, Patent Abstracts of Japan, Vol. 7, No. 240 (M-251), Oct. 25, 1983 and JP-A-58 126 434; DE-A-41 00 937; EP-A-0 604 979. A patent application not previously published is DE-A-44 23 577).

In the especially preferred embodiment of the invention, however, one and the same electric machine serves to dampen radial vibrations and rotational nonuniformities. This cited state of the art gives no prompting in the direction of a dampening of radial vibration—much less its combination with a dampening of rotational nonuniformity.

Essentially, the dampening of rotational nonuniformity can occur such that the electric machine only operates in braking (and this at the moment of a positive rotational nonuniformity, i.e., a torque above the mean value) or only driving (at times of negative rotational nonuniformity, i.e., a torque below the mean value). The electric machine then works as an intermittent brake or as an intermittent motor.

An especially effective reduction of rotational nonuniformity, however, is provided by an operation in which the electric machine produces a rapidly alternating torque, namely, a braking one for positive rotational nonuniformity and a driving one for negative.

In order to achieve a longer-lasting driving or braking action, the electric machine can apply to the shaft a positive or negative constant torque. By "constant torque" is meant a torque which is constant or varies slowly as compared to the alternating torque when dampening rotational vibration. A braking constant torque can serve to have the electric machine work as a generator for power supply (say, to charge a battery or energize an on-board network) and/or as a non-wearing vehicle brake. A driving constant torque can be used to start the engine or sustain the engine, e.g., when accelerating the vehicle (the electric machine then works as a "booster").

As a second additional function, the electric machine works as an electromagnetic coupling in the drive train and/or as an active transmission synchronization device. It can then be arranged in place of or in addition to a traditional frictional coupling or a traditional hydrodynamic transducer. In an advantageous embodiment, the electric machine is mounted so that it can rotate as a whole, i.e., besides the rotating rotor it also has a rotating stator. One of these active elements (rotor or stator) is connected to the drive shaft (e.g., the crankshaft) coming from the engine, and the other is connected to the takeoff shaft, leading to the transmission, for example. By adjusting a suitable relative rotary speed (i.e., a suitable slip) between rotor and stator, the coupling function is accomplished. For example, vanishing clutch slip corresponds to a frictional clutch engaged. The dampening functions for radial vibrations and possible for rotational nonuniformities are also accomplished here by applying rapidly alternating forces and possibly torques between rotor and stator. In order to accomplish the generator function, one engages a slightly braking clutch slip. When starting, one secures the takeoff shaft, e.g., by means of a brake device, against which the torque of the electric machine is buttressed during the starting. In the context of an antislip control, the drive slip at the wheels can also be diminished by increasing the clutch slip, instead of by braking.

When acting as an active transmission synchronization device, the electric machine brakes or accelerates the takeoff shaft leading to the transmission, depending on whatever is required in the course of a gear shifting operation to accomplish a synchronized running of transmission gears. Apart from the starting, when no dampening of radial vibration is generally necessary, these additional functions can be carried out at the same time as the dampening of radial vibration. The control of the active electromagnetic device (especially in the form of the electric machine) is advantageously taken on by one—or when there are several active sectors—of several invertors. These supply the windings of the active electromagnetic device with currents and voltages of freely adjustable amplitude, frequency, and/or phase to generate the desired traveling fields. Advantageously, the invertor is configured as a pulse invertor.

The active reduction of vibrations is based—as mentioned above—on the fact that the active electric device applies a force to the shaft, opposite in direction to the vibration.

Its required frequency and phase can be achieved, for example, by a corresponding open-loop or closed-loop control of the active electromagnetic device. In the open-loop control, for example, the anticipated quantities of the radial vibration, such as direction, frequency, amplitude and phase, are saved in a characteristic field or in the form of a functional relationship as a function of one or more parameter, such as the rotary speed of the engine and the throttle valve position. For the particular parameter values determined by ongoing measurement, the anticipated vibration quantities are determined from this and finally the required force to be produced by the active electromagnetic device is determined. Of course, the required force can also be saved directly in memory as a function of the parameters. In closed-loop control, the actual momentary velocity of bending vibration or the momentary deflection from the position of rest is detected (e.g., with a magnetic field sensor) and the required force is determined from this. Advantageously, mixed forms are also possible, e.g., a characteristic field control, yet whose memorized information is not fixed, but rather constantly adapted to the actual vibration relationships existing on the basis of measurement findings.

The influencing of rotational nonuniformities, when necessary, is accomplished in corresponding fashion by closed-loop, open-loop, or mixed forms of control, wherein the measured quantities might be, for example, the momentary rotary speed (e.g., measured with a rotation transformer) or the momentary torque (e.g., measured with a torque metering shaft).

In order to accomplish the highest possible overall efficiency of the system, at least part of the energy obtained from braking (i.e., from dampening of radial vibrations and perhaps from applying a braking torque) is advantageously saved up and re-used (i.e., to apply an accelerating torque, if necessary).

The saving up of the brake energy can occur, in particular, through an electric accumulator, e.g., a capacitance, an inductance, and/or a fast battery. A storage in the form of kinetic energy is also possible, e.g., in a flywheel accumulator.

The invention shall now be explained more closely by means of sample embodiments and the enclosed schematic drawing.

Figure 1:
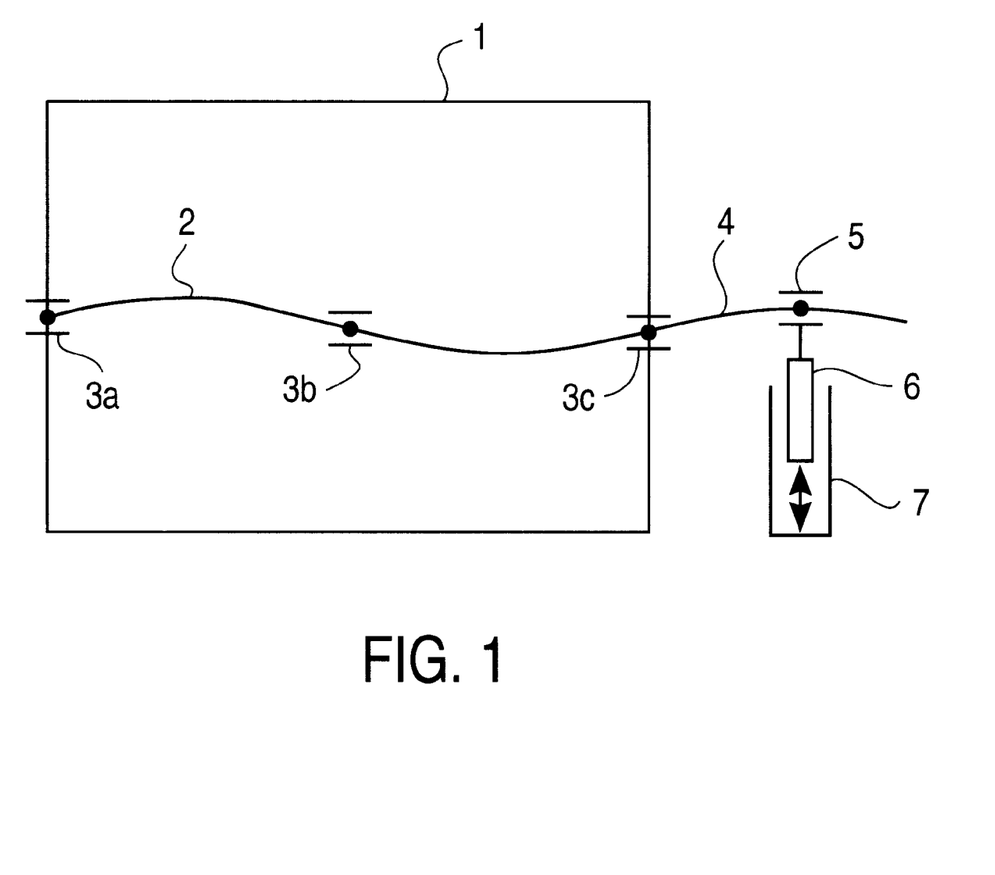
FIG. 1 a schematic cross section of a system for active reduction of radial vibrations with an actuator.

In FIG. 1, an internal combustion engine 1, which is for example a two-cylinder Otto motor, has a crankshaft 2 and three crankshaft bearings 3a, b, c. The crankshaft 2 is excited into radial vibrations by virtue of the periodically occurring gas and mass forces. Because of the rigidity of the crankshaft 2, the bending vibration is propagated to the outside, to an extension of the crankshaft 4. The extension of the crankshaft 4 is mounted on a movable shaft bearing 5, to which is secured a positioning element 6 of a linear positioner 7. This linear positioner transforms an electric control signal into a mechanical linear position by applying a force. This is done in opposite phase to the radial velocity of the shaft, i.e., with 180° phase displacement. Thus, energy is removed from the shaft. The amplitude of vibration decreases, which dampens the radial vibration.

Figure 2:
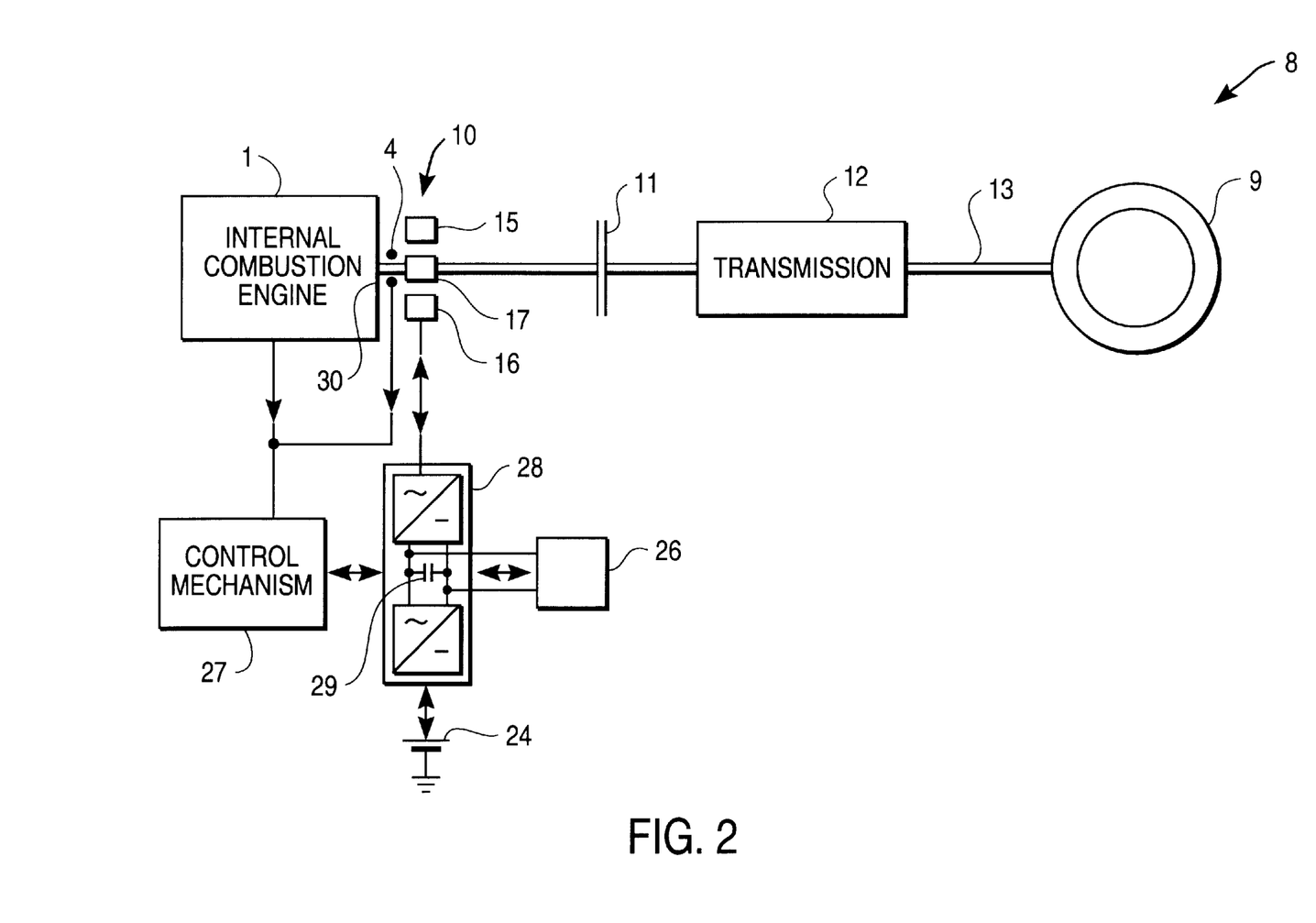
FIG. 2 a schematic representation, not to scale, of a system for active reduction of radial vibrations with an electric machine.

A drive system of a motor vehicle, e.g., a passenger car per FIG. 2, has an internal combustion engine 1 as its drive assembly. The torque produced by the engine 1 can be transmitted via a drive train 8 to drive wheels 9. In the drive direction, an electric machine 10 is first arranged in the drive train 8 after the engine 1. Next comes a coupling 11, a transmission 12, and an axle drive 13, which transmits the torque to the drive wheels 9. The crankshaft 2 of the engine 1, because of the gas and mass forces, executes radial vibrations, which are propagated to the outside through the extension of the crankshaft 4.

The electric machine 10 comprises two sector machines 15, 16, which act jointly on a rotor 17. The sector machines 15, 16 are firmly propped against the engine 1, a vehicle chassis (not shown), or a clutch housing (not shown), while the rotor 17 sits directly on the extension of the crankshaft 4 of the engine 1 and is firmly coupled to it. The extension of the crankshaft 4 and the rotor 17 thus rotate together, without an intervening transmission being involved.

Figure 3:
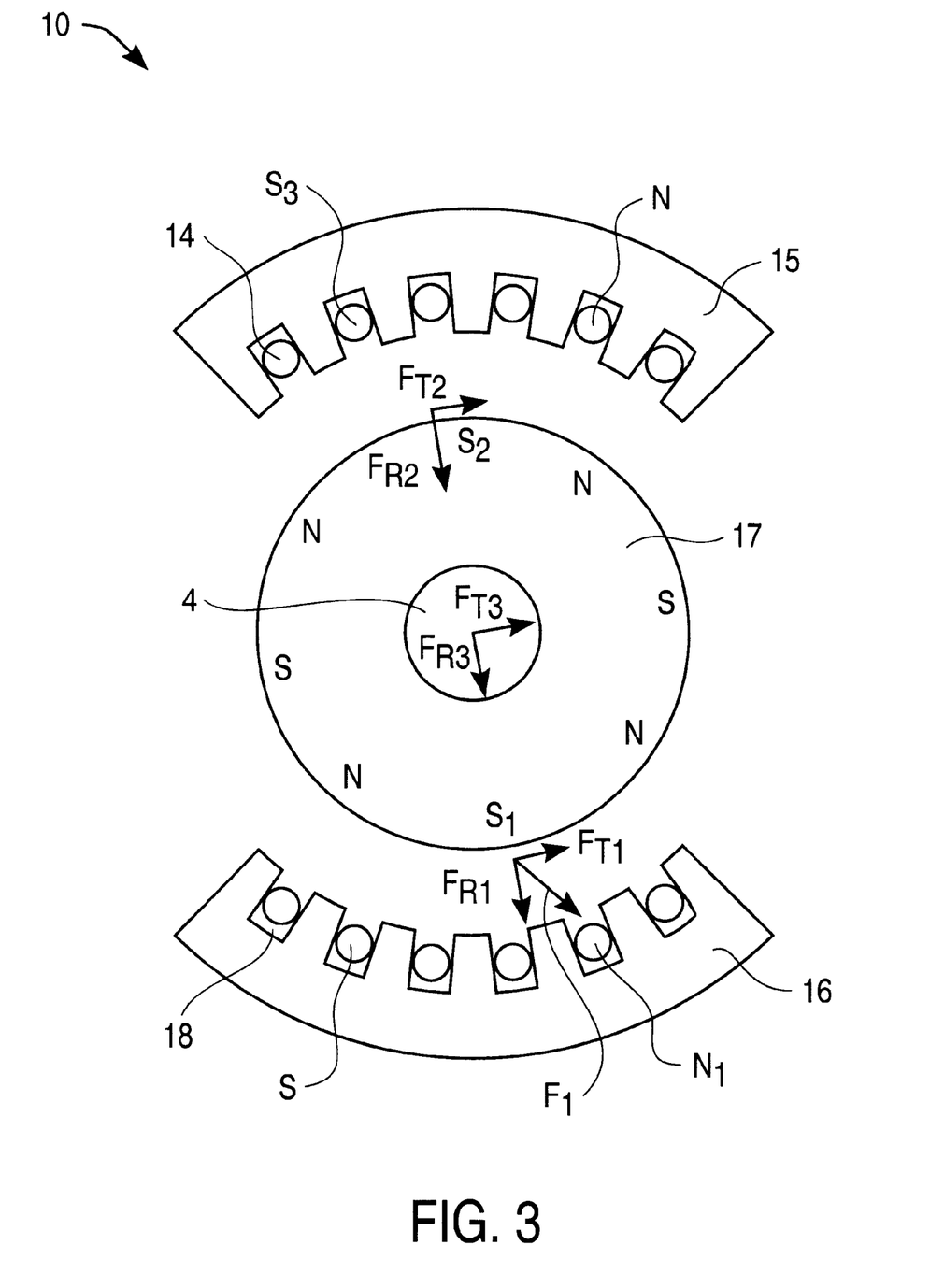
FIG. 3 a schematic cross section of the electric machine, perpendicular to the axial direction.

The mode of operation of the electric machine 10 is shown by FIG. 3. The interior rotor 17, firmly joined to the extension of the crankshaft 4, bears magnetic poles, which be formed by permanent magnets or magnetic coils energized through slip rings. The sector machines 15, 16 have three-phase windings 14, which when fed three-phase current produce traveling fields, each with two poles. There are three grooves 18 per pole, thus, a total of six grooves 18 per sector machine 15, 16. The momentary position of the pole is designated by the symbols "S" (south pole) and "N"0 (north pole). The eliciting of radial forces on the shaft 4 illustrates the force of attraction $F_1$ exerted by the north pole $N_1$ of the sector machine 15 on the south pole $S_1$ of the rotor 17, which can be broken down into a radial component $FR_1$ and a tangential component $F_{T1}$. With the radial force $F_{R1}$, radial vibrations of the shaft in the direction of the radial force $F_{R1}$ can be directly counteracted. Yet it is also possible to counteract radial vibrations in the direction of the force $F_{T1}$. Thus, say, the south pole $S_3$ of the second sector machine 15 exerts a repulsive force with a tangential component $F_{T2}$ on the south pole $S_2$ of the rotor 17. The two torques exerted by the forces $F_{T1}$ and $F_{T2}$ on the rotor 17 cancel each other out; there remains a radial force $F_{T3}$. The two radial forces $F_{R1}$ and $F_{R2}$ acting on the rotor 17 add up to the resultant radial force $F_{R3}$. Thus, the electric machine 10 can apply radial forces of any desired direction to the shaft 4 and, hence, counteract radial vibrations of any given direction.

Figure 4:
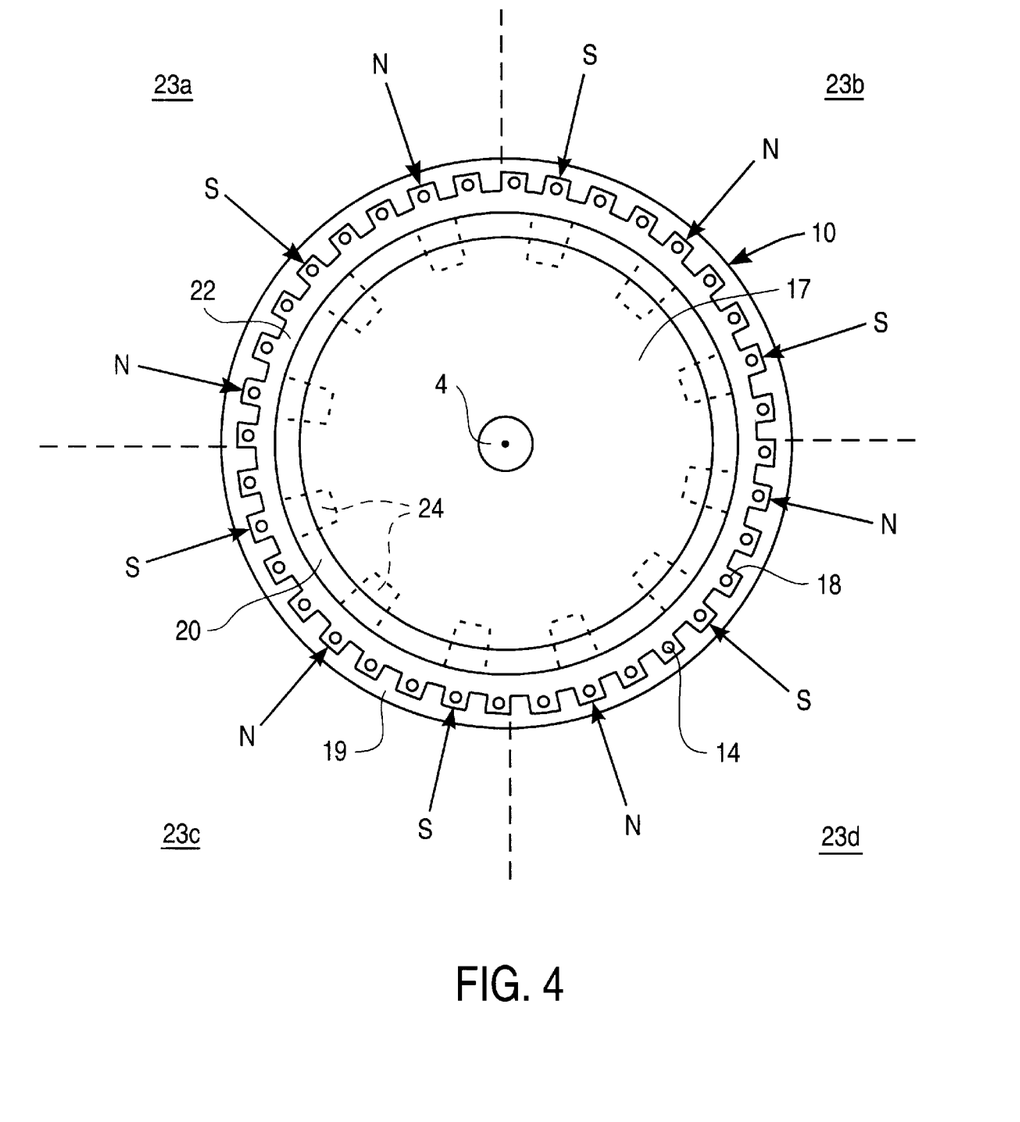
FIG. 4 a schematic cross section of a second embodiment of an electric machine, perpendicular to the axial direction.

FIG. 4 shows another embodiment of an electric machine 10 for dampening of radial vibration. It comprises a rotor 17 firmly coupled to the extension of the crankshaft 4 and an exterior continuous-circle stator 19 of magnetically conducting material (here, iron). The stator 19 comprises grooves 18 in the direction of the shaft 4. The electric machine can be designed as a synchronous or an induction machine. The interior rotor 17 is fashioned, in an induction machine, as a squirrel cage rotor with cage bars essentially traveling in the axial direction, each of them being connected at the end to a short-circuit ring 20. In the synchronous machine, the rotor 17 bears a corresponding number of poles to the stator 19 (here, twelve poles), which can be formed by permanent magnets or magnetic coils energized by slip rings. FIG. 4 illustrates the synchronous machine, schematically indicating the rotor poles 21 present in it. An air gap 22 which is ring shaped in cross section exists between rotor 17 and stator 19.

The stator 19 bears here four independent windings 14, each of which extends across a 90° sector 23*a, b, c, d* of the stator 19. When fed with three-phase current, these form four traveling fields, each with three poles. There are three grooves 18 per pole, and thus a total of nine grooves 18 per sector. The momentary position of the poles is indicated by the symbol "S" (for south pole) and "N" (for north pole).

The electric machine 4 of FIG. 4 thus corresponds functionally to four sector machines, which act jointly on a rotor 17. The four three-phase windings 14 of the four sectors 23*a, b, c, d* are electrically independent. This is accomplished by hooking them up with four independent invertors (not shown here). Each independent sector 23*a, b, c, d* can apply radial forces to the shaft 4, as explained in FIG. 3 for sector machines 15, 16, and thus counteract radial vibrations.

Figure 5A:
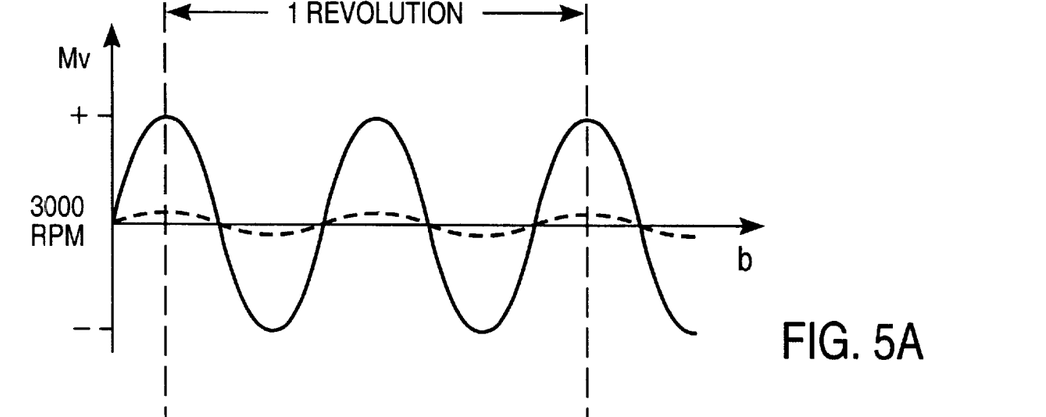
FIG. 5a, 5b and 5c are a schematic sample representation of the mode of functioning of the vibration reduction.

As illustrated in FIG. 3, a sector machine also produces torque-causing forces (e.g., $F_{T1}$), besides radial forces (e.g., $F_{R1}$). Therefore, the electric machine 10 of FIG. 4 can counteract rotary vibrations of the shaft 4, in addition to radial vibrations, which are caused by the gas and mass forces of the motor 1. FIG. 5*a* illustrates (by solid line) the torque Mv of the engine 1 as a function of the angle of rotation b of the crankshaft 2.

Figure 5B:
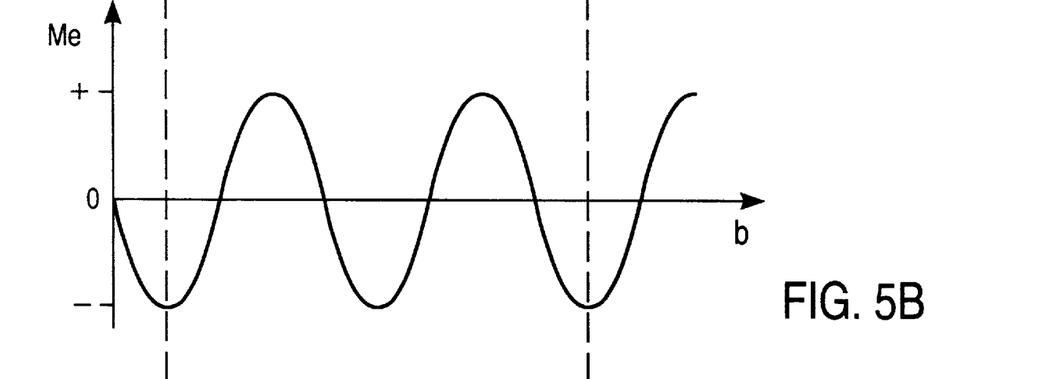

In FIG. 5*b*, the torque Me is shown as a function of the shaft angle, as applied by the electric machine 10. The curve of this torque largely corresponds to that of the engine torque Mv, but is of opposite direction. The result is a reduction or even a total vanishing of the torque fluctuations Mv, as illustrated in FIG. 5*a* by the broken line. In the operating manner shown in FIG. 5*b*, the negative and positive torque extrema are identical in magnitude. Thus, the energy obtained during a braking phase is essentially the same size as the energy required during the following drive phase.

When counteracting radial vibrations or applying a braking torque, mechanical energy is removed from the system and transformed into electric energy. The electric machine 10 then has in addition the function of a generator, which can furnish current, e.g., to compensate for the operating losses of the system, to charge the car battery 24, and to power electrical consumers.

Figure 5C:
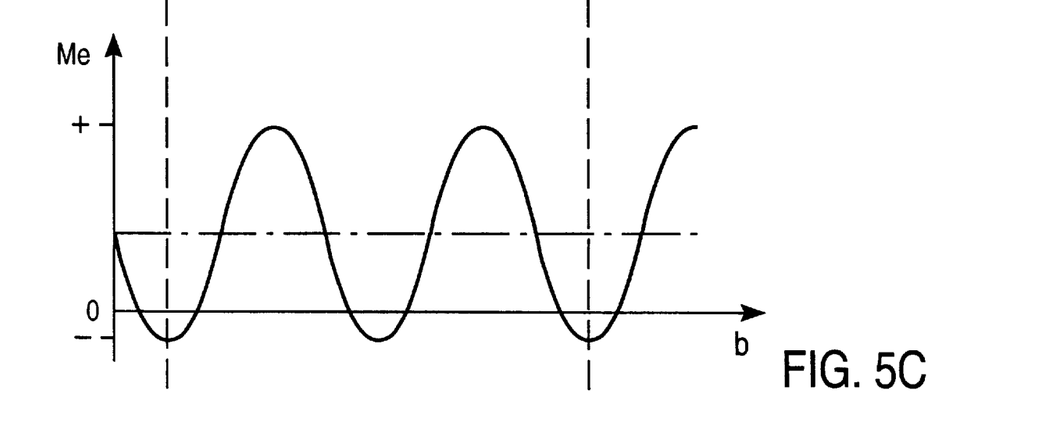

The torque Me of the electric machine 10 can also be shifted in the positive direction per FIG. 5*c*. The electric machine 10 then serves as a (driving) motor, in addition to reducing radial and rotational vibrations, e.g., to support the engine 1 when accelerating the vehicle.

Thus, the electric machine 10 fulfills several functions: on the one hand, it reduces radial and rotary vibrations of the shaft 4, on the other it functions as a generator to charge a car battery 24 and thus replaces a dynamo traditionally present in the motor vehicle. Moreover, the generator function can serve to brake the vehicle or the engine 1. Furthermore, the electric machine can function as an additional motor ("booster"), e.g., to support the internal combustion engine 1 when accelerating the vehicle. It also serves as a starter for the engine 1 and thus can also replace a separate starter traditionally present in the motor vehicle. Finally, by virtue of the moment of inertia of the rotor 17, it functions as a flywheel and thus can replace the flywheel mounted on the crankshaft, which is traditionally present in motor vehicles.

According to FIG. 2, an invertor 28 of each active sector of the stator 19 or each sector machine 15, 16 furnishes voltage pulses of freely selectable amplitude, frequency and phase at a high clock frequency (e.g., 100 Hz) (only one invertor is shown).

In the intermediate circuit of the invertor 28 there is arranged a capacitance 29 and accumulators 26 are connected to the intermediate circuit of the invertor 28, which can be a flywheel, a battery, or a capacitance. The accumulator 26 and the capacitance 29 have the purpose of buffering the energy obtained when braking the shaft 10 and then surrendering it again.

A control mechanism 27 instructs the invertor 28 at each time as to which amplitude, frequency and phase the generated alternating voltages should have, by appropriate actuation of its semiconductor switch. The control mechanism 27, which can be formed, for example, by an appropriately programmed microcomputer system, at first determines the magnitude and the direction of radial force and torque which the electric machine 10 should generate at a particular moment of time. It can do this, e.g., by means of a characteristic field control, in which it obtains as input information the angle and radial position of the shaft 4, the momentary mean rotary speed, and possibly other operating parameters, such as the throttle valve position, and determines from a memorized characteristic field the radial vibration and rotational nonuniformity to be expected at the moment, as a function of these operating parameters. Another possibility consists in determining the radial vibrations and rotational nonuniformities which are actually present. A combination of closed-loop and open-loop control is also possible.

There are two sensors 30 (only one sensor is shown) for measuring the radial deflection and velocity. The sensor 30 has a ferrite core, configured as a yoke about the shaft 4, with windings energized by alternating current. The lines of flux of the resulting electromagnetic field emerge at one end of the ferrite core of the sensor 30 and travel across an air gap in the shaft 4, emerge from the shaft 4 and travel across another air gap into the other end of the ferrite core of the sensor 30. If the shaft 4 is executing radial vibrations, the size of the air gaps and, thus, the inductance of the sensor 30 will change. From this, the momentary deflection and velocity of the shaft 4 in one radial direction can be determined. The second sensor is used to detect the deflection and velocity of the shaft 4 in another radial direction. Furthermore, the electric machine 10 is outfitted with a rotation transformer (so-called resolver) (not shown here) to measure the rotational nonuniformities. It consists of two adjacent circuit boards, one of which is stationary and the other turns with the shaft 4. The circuit boards carry on their facing surfaces windings formed by conductor tracks, such that a transformer ratio dependent on angle of rotation results. The rotation transformer works by the transponder principle: The stationary windings (stationary boards) are actively energized with current/voltage and beam electromagnetic energy to the rotating windings (rotating board). The latter beam back a portion of this energy, the reflection factor being dependent on the angle of rotation. The back-radiated portion generates a signal dependent on angle of rotation in the stationary windings. An evaluation of this signal furnishes the momentary angle of rotation of the shaft 4 with a precision of at least 0.5 degrees.

From the value determined for the momentary radial vibration and the momentary rotational nonuniformity, values (in opposite phase) are derived for the rapidly varying radial force and torques applied by the electric machine 10, onto which an additional positive or negative torque of desired strength may be additively superimposed. For starting the engine 1, the nominal torque can be determined on the basis of memorized data, which specify the time curve of the rotary speed or that of the torque of the electric machine 4 during the starting process, possibly supplemented by a measurement of these quantities and a feedback control, which ensures observance of the settings.

In a second step, the control mechanism 27 determines which amplitude, frequency and phase of the voltages or currents have to be provided by the invertors 28 so that the electric machine 10 exerts the desired radial forces and torques.

Thus, one and the same electric machine 10 can counteract both radial vibrations and rotational vibrations of the shaft 4, wherein the vibration dampening can occur over a broad frequency band and the degree of dampening and the dampening characteristics can be freely adjusted in broad limits.

What is claimed is:

1. System for active dampening of vibrations of the drive shaft of an internal combustion engine, by means of an electric machine, which has two active electromagnetic units that can rotate relative to each other, one of which is connected to the rotating shaft and the other is secured against turning or—alternatively—connected to another rotating shaft, wherein one of the active units comprises at least two electrically independently actuable active sectors for generating traveling fields, each of which exerts forces with radial and tangential components on the other active unit, such that the electric machine dampens both radial and rotational vibrations of the shaft.

2. System per claim 1, in which the independently actuable active sectors are separate active sectors.

3. System per claim 1, in which the independently actuable active sectors are formed by independent winding segments, which are arranged jointly on a magnetically conducting stator body.

4. System according to claim 1, in which the electric machine can load the shaft in addition with a driving or braking constant torque.

5. System according to claim 1, in which the electric machine is designed such that it also has the function of a starter for the internal combustion engine, a generator for power supply, a vehicle brake, or an acceleration booster for the vehicle.

6. System according to claim 1, in which a braking or slipping action is generated and energy obtained in the braking or slipping action is at least partly stored up and at least partly reused.

7. System according to claim 1, in which the electric machine is controlled by an invertor, which supplies it with currents and voltages of variable amplitude, frequency and phase in order to generate the electromagnetic fields.

8. System according to claim 1, in which both electromagnetic units can rotate, one of which is connected to the drive shaft and the other to a vehicle take-off shaft of a vehicle drive train, and the electric machine also acts as an electromagnetic coupling in the drive train or as an active transmission synchronization device for a transmission arranged in the drive train, by adjusting suitable relative rotary speeds between the electromagnetic units.

* * * * *